United States Patent
Mayer et al.

(10) Patent No.: US 9,899,900 B2
(45) Date of Patent: Feb. 20, 2018

(54) METHOD OF MANUFACTURING THE ROTOR ASSEMBLY FOR AN ELECTRIC MOTOR

(71) Applicant: Atieva, Inc., Redwood City, CA (US)

(72) Inventors: Jeremy Mayer, Mountain View, CA (US); Yifan Tang, Los Altos, CA (US)

(73) Assignee: Atieva, Inc., Menlo Park, CA (US)

( * ) Notice: Subject to any disclaimer, the term of this patent is extended or adjusted under 35 U.S.C. 154(b) by 324 days.

(21) Appl. No.: 14/598,019

(22) Filed: Jan. 15, 2015

(65) Prior Publication Data

US 2016/0211731 A1 Jul. 21, 2016

(51) Int. Cl.
| | |
|---|---|
| *H02K 15/02* | (2006.01) |
| *H02K 19/04* | (2006.01) |
| *H02K 15/00* | (2006.01) |
| *C25D 3/02* | (2006.01) |
| *C25D 3/38* | (2006.01) |
| *H02K 19/14* | (2006.01) |
| *H02K 19/10* | (2006.01) |

(52) U.S. Cl.
CPC ....... *H02K 15/024* (2013.01); *H02K 15/0012* (2013.01); *H02K 19/04* (2013.01); *C25D 3/02* (2013.01); *C25D 3/38* (2013.01); *H02K 19/10* (2013.01); *H02K 19/14* (2013.01); *Y10T 29/49009* (2015.01); *Y10T 29/49012* (2015.01)

(58) Field of Classification Search
CPC .. H02K 15/0012; H02K 15/024; H02K 19/04; H02K 19/10; H02K 19/14; Y10T 29/49009; Y10T 29/49012; C25D 3/02; C25D 3/38

See application file for complete search history.

(56) References Cited

U.S. PATENT DOCUMENTS

| | | | | |
|---|---|---|---|---|
| 4,064,410 A | * | 12/1977 | Roach | ................ H02K 15/0012 310/211 |
| 4,131,990 A | | 1/1979 | Roach | |
| 8,365,392 B2 | * | 2/2013 | Lyons | ................ H02K 15/0012 29/596 |
| 2003/0184185 A1 | * | 10/2003 | Yoshino | ................ H02K 19/14 310/211 |
| 2011/0062819 A1 | | 3/2011 | Lyons et al. | |
| 2011/0283525 A1 | | 11/2011 | Czebiniak | |
| 2012/0248901 A1 | * | 10/2012 | Maeda | ................ H02K 15/0012 310/44 |

(Continued)

FOREIGN PATENT DOCUMENTS

| | | |
|---|---|---|
| JP | 59059051 A * | 4/1984 |
| JP | S58-088914 | 12/1984 |
| JP | S59-182851 | 6/1986 |

(Continued)

OTHER PUBLICATIONS

Die Casting, Dec. 8, 2013, URL: https://web.archive.org/web/20131208072246/http://en.wikipedia.org/wiki/Die_casting.

*Primary Examiner* — A. Dexter Tugbang
(74) *Attorney, Agent, or Firm* — Patent Law Office of David G. Beck (57) ABSTRACT

A method is provided for fabricating a rotor assembly for an electric motor which utilizes pre-fabricated conductive rotor bars and die cast end rings. Containment rings, which may be installed on the end rings either before or after casting, may be used to inhibit end ring creep at high rotational speeds.

20 Claims, 8 Drawing Sheets

(56) References Cited

U.S. PATENT DOCUMENTS

2012/0293036 A1\* 11/2012 Kleber ............... H02K 15/0012
310/211

FOREIGN PATENT DOCUMENTS

| JP | H04-088855 | | | 3/1992 |
|----|------------|---|---|--------|
| JP | 08149769 A | \* | | 6/1996 |
| JP | H09-074726 | | | 3/1997 |
| JP | 2000-023427 | | | 1/2000 |
| JP | 2010-166779 | | | 7/2010 |
| JP | 2012-253919 | | | 12/2012 |

\* cited by examiner

METHOD OF MANUFACTURING THE ROTOR ASSEMBLY FOR AN ELECTRIC MOTOR

FIELD OF THE INVENTION

The present invention relates generally to an electric motor assembly and, more particularly, to an efficient rotor manufacturing technique that can be used to fabricate a structurally robust rotor assembly capable of maintaining mechanical balance and electrical performance over wide temperature, torque, and rotational speed ranges.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In recent years, electric vehicles have proven to be not only environmentally friendly, but also capable of meeting, if not exceeding, consumer desires and expectations regarding performance. While early electric vehicles used DC motors in order to achieve the variable levels of speed and torque required to drive a vehicle, the advent of modern motor control systems utilizing direct torque control have allowed AC motors to deliver the same level of performance while providing the many benefits associated with AC motors including small size, low cost, high reliability and low maintenance.

A variety of techniques are currently used to manufacture the rotor assembly in an AC motor, these techniques offering a range of performance capabilities. Regardless of the manufacturing technique, in general the rotor assembly consists of a plurality of laminated discs that are combined to form a stack. The laminated discs within the stack include a plurality of peripherally spaced openings or slots. Passing through each set of openings or slots is a metal conductive bar, typically fabricated from either aluminum or copper. The openings or slots may be aligned so that the conductive bars are parallel to the axis of the rotor assembly, or they may be slightly skewed causing the conductive bars to be oblique to the axis of the rotor assembly. The conductive bars may either be cast in place or pre-fabricated and inserted into and through the stack of laminated discs. At either end of the rotor assembly is an end ring formed by mechanically and electrically joining together the ends of the conductive bars that extend beyond the stack.

Die casting is a widely used technique to fabricate a rotor assembly. One of the benefits of this approach is that the conductive bars and the end rings may be cast in a single operation, thus simplifying fabrication. U.S. Pat. Nos. 2,607,969 and 2,991,518 disclose conventional and vacuum-assisted die casting techniques, respectively, that may be used to cast rotors fabricated from any of a variety of conducting metals. However due to the higher melting temperature and the greater density of copper, the techniques disclosed in these patents are best applied to aluminum castings. U.S. Pat. No. 5,332,026 discloses an improvement in the casting system that is designed to compensate for some of the unusual problems associated with die casting copper, thereby allowing rotor cage electrical conductivity of 95% or greater to be achieved in a die cast rotor.

Rather than using a casting technique, the rotor assembly may also be formed by inserting a plurality of arcuately spaced apart conductive bars through a stack of laminated discs as disclosed in U.S. Pat. No. 4,064,410. End rings, disposed at opposite ends of the stack, are welded to the protruding end portions of the bars.

In order to decrease the electrical resistance associated with the end ring assemblies, U.S. Pat. No. 8,365,392 discloses a rotor assembly in which slugs are brazed between the end portions of the rotor bars, the braze joints contacting a large percentage of the rotor bar end portions. After each rotor bar/slug assembly is heated to form a plurality of braze joints, each of the two rotor bar/slug assemblies is machined to remove a circumferential edge portion. Then, in at least one embodiment, a containment ring is fit over the machined regions of each rotor bar/slug assembly.

While there are a variety of techniques that may be used to fabricate the rotor assembly of an electric vehicle's motor, there are trade-offs associated with each approach between manufacturing complexity and cost and the resultant rotor's electrical and mechanical characteristics. Accordingly, what is needed is a rotor manufacturing process that is both cost effective and capable of yielding a structurally robust rotor that exhibits excellent electrical characteristics. The present invention provides such a manufacturing process.

SUMMARY OF THE INVENTION

The present invention provides a method of fabricating the rotor assembly of an electric motor, the method comprising the steps of (i) assembling a lamination stack, where the lamination stack is comprised of a plurality of lamination discs, where each of the lamination discs is comprised of a first plurality of slots, and where each of the lamination discs is further comprised of a central bore; (ii) inserting a plurality of conductive rotor bars into the first plurality of slots corresponding to the lamination stack, where a first end portion of each of the plurality of conductive rotor bars extends beyond a first end surface of the lamination stack, and where a second end portion of each of the plurality of conductive rotor bars extends beyond a second end surface of the lamination stack; (iii) locating a shaft within the central bore of the lamination stack; (iv) locating a first member adjacent to the first end surface of the lamination stack, where at least a portion of the first member is encircled by the first end portion of each of the plurality of conductive rotor bars, and where the first member at least partially defines a first end ring of the rotor assembly; (v) locating a second member adjacent to the second end surface of the lamination stack, where at least a portion of the second member is encircled by the second end portion of each of the plurality of conductive rotor bars, and where the second member at least partially defines a second end ring of the rotor assembly; (vi) die casting the first end ring and the second end ring of the rotor assembly, where the first end ring is comprised of the first end portion of each of the plurality of conductive rotor bars, and where the second end ring is comprised of the second end portion of each of the plurality of conductive rotor bars; and (vii) removing the shaft, the first member and the second member from the rotor assembly. The conductive rotor bars may be fabricated from oxygen-free electrolytic copper. After completion of the die casting step and after the shaft, first member and second member have been removed from the rotor assembly, the method may further include the steps of inserting a rotor shaft within the central bore of the lamination stack, mounting a first bearing assembly onto the rotor shaft proximate to the first end ring, and mounting a second bearing assembly onto the rotor shaft proximate to the second end ring. Each end ring may be defined by an outer cylindrical surface and an inner cylindrical surface; alternately, each end ring may be defined by an outer cylindrical surface and an inner sloped surface; alternately, each end ring may be defined by an outer cylindrical surface and a stepped inner surface.

In one aspect, prior to die casting the first and second end rings the method may further include the steps of fitting a first containment ring around the first end portion of each of the plurality of conductive rotor bars and fitting a second containment ring around the second end portion of each of the plurality of conductive rotor bars. The first and second containment rings may be fabricated from any of a variety of materials, exemplary materials including stainless steel, beryllium copper alloys and metal matrix composites.

In another aspect after the die casting has been completed, the method may further include the steps of (i) machining the first end ring to remove a first circumferential portion corresponding to the first end ring and then fitting a first containment ring around the first end ring, where the first containment ring encircles the first end portion of each of the plurality of conductive rotor bars, and where the first containment ring is positioned where the first circumferential portion of the first end ring was removed during the machining step; and (ii) machining the second end ring to remove a second circumferential portion corresponding to the second end ring and then fitting a second containment ring around the second end ring, where the second containment ring encircles the second end portion of each of the plurality of conductive rotor bars, and where the second containment ring is positioned where the second circumferential portion of the second end ring was removed during the machining step. The first and second containment rings may be held in place by forming an interference fit between the first and second containment rings to the first and second end rings, respectively; alternately, by soldering the first and second containment rings to the first and second end rings, respectively; alternately, by welding the first and second containment rings to the first and second end rings, respectively; alternately, by bonding the first and second containment rings to the first and second end rings, respectively. The first and second containment rings may be fabricated from any of a variety of materials, exemplary materials including stainless steel, beryllium copper alloys and metal matrix composites.

In another aspect, the shaft and the first member may be fabricated as a single component, i.e., as a plug. The shaft, first member and second member may be fabricated from steel, where the steel is coated with a non-stick coating to prevent adhesion by the casting material.

In another aspect, the step of assembling the lamination stack may include the steps of stamping each of the plurality of lamination discs from a metal and coating each of the plurality of lamination discs with an electrically insulating coating.

In another aspect, the step of assembling the lamination stack may include the steps of fabricating each of the plurality of lamination discs from a metal, fabricating a plurality of electrically insulating spacer discs, and interposing one of the plurality of electrically insulating spacer discs between adjacent lamination discs. The spacer discs include a second plurality of slots which may be of approximately the same size, or larger, than the first plurality of slots included in the lamination discs.

In another aspect, the step of assembling the lamination stack may include first and second end stack lamination discs located at either end of the lamination stack, where the first and second end stack lamination discs are thicker than the lamination discs interposed between first and second end stack lamination discs. The first and second end stack lamination discs include a second plurality of slots which may be of approximately the same size, or larger, than the first plurality of slots included in the lamination discs.

In another aspect, each of the first plurality of slots included in each of the lamination discs is sized larger than the cross-section of the corresponding conductive rotor bar, thus allowing casting material to be forced through the slots of the lamination stack during the casting step. Preferably the slots are sized such that after insertion of the conductive rotor bars there remains a portion within each slot that is unfilled by the corresponding conductive rotor bar, this portion extending inwardly past the innermost edge of the corresponding conductive rotor bar towards the central bore.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

Figure 1:
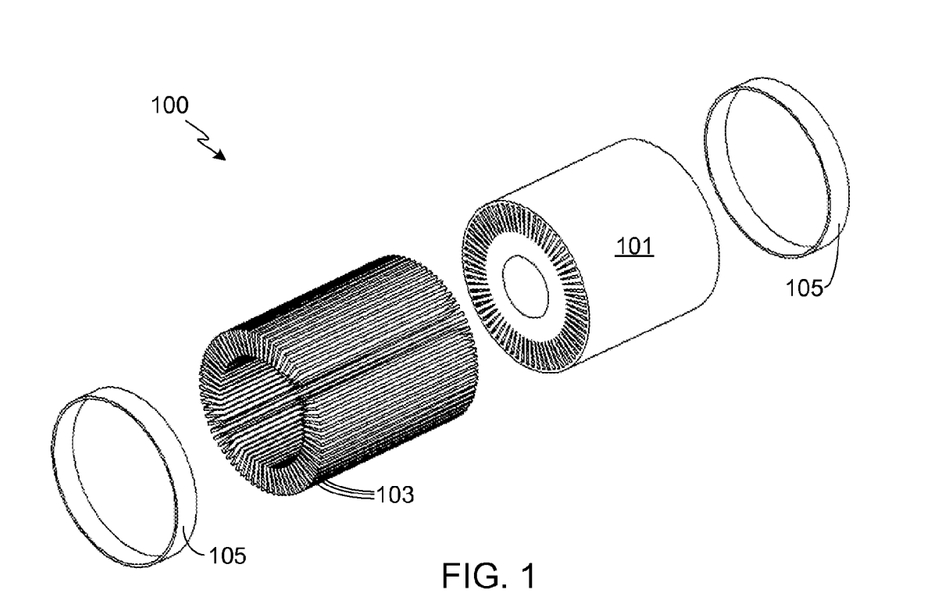
FIG. 1 provides an exploded, perspective view of a rotor assembly.

The rotor assembly fabrication technique of the present invention combines elements of die casting with a rotor fabrication technique in which pre-fabricated conductive bars are inserted into a stack of laminated discs. FIG. 1 provides an exploded, perspective view of rotor assembly 100 and the primary components comprising the assembly. Note that this view does not show the rotor shaft or the bearing assemblies. Preferably the invention is used to fabricate a rotor assembly in which the conductive bars and the end rings are comprised of copper, although it should be understood that this technique may also be used to fabricate rotor assemblies comprised of other materials (e.g., aluminum).

Figure 2:
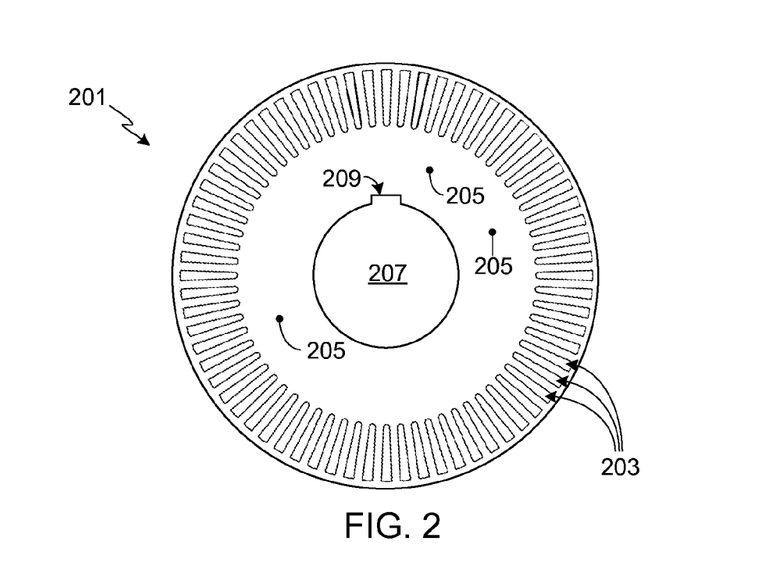
FIG. 2 provides an end view of a single lamination used in the formation of the lamination stack of the rotor assembly shown in FIG. 1.

Rotor lamination stack 101 of assembly 100 is comprised of a plurality of lamination discs 201, with a selected stack length preferably somewhere within the range of 50 to 200 millimeters. Preferably the outer diameter of the rotor assembly is within the range of 100 to 150 millimeters.

FIG. 2 provides an end view of a single disc 201. Each disc 201, which is preferably comprised of steel with a thickness selected to be within the range of 0.18 to 0.40 millimeters, may be fabricated using a stamping process or other technique. Preferably discs 201 are coated, for example with an oxide, in order to electrically insulate the laminations from one another. Alternately, the metal discs comprising the stack may be electrically isolated from one another by the inclusion of an electrically insulating spacer disc located between adjacent metal discs.

In at least one preferred embodiment, the last disc located on either end of stack 101 is thicker than the remaining discs, thereby insuring that the stack is not damaged during the casting operation. Typically in this configuration the end discs have a thickness selected to be within the range of 1.0 to 3.5 millimeters. The end discs may have lesser magnetic properties than the lamination discs, or may even be comprised of a non-magnetic material. The end discs may utilize the same slot size as that used in the lamination discs, thus allowing the same tooling to be used to manufacture the slot pattern in both. Alternately, the slot size of the end discs may be slightly larger than slots 203 in lamination discs 201, thereby allowing some of the molten copper to flow into the end discs and hold the copper bars in place against the slot walls. Rigidly coupling the conductive bars 103 to the end discs may be used to improve rotor performance, for example by reducing rotor buckling and/or bar movement during high speed operation and/or during thermal cycling of the rotor assembly.

As noted above, each disc 201 (or each disc 201 and each interposed spacer disc) includes a plurality of slots 203 through which conductive bars 103 are inserted. Slots 203, all of which have substantially the same shape and dimensions, have a shape that is complementary to the cross-sectional shape of conductive bars 103. Preferably slots 203 have an approximately rectangular shape. It will be appreciated that the rotor assembly fabrication technique of the present invention is not limited to a specific number of slots 203, nor is it limited to a specific shape for bars 103/slots 203, and that the number and shape of the bars and slots in the figures are only meant to illustrate, not limit, the invention.

Each disc 201 (or each disc 201 and each interposed spacer disc) may include one or more indentations 205, e.g., dimples, or other locating means that may be used to register each of the discs to an adjacent disc, thereby insuring proper alignment of slots 203. Depending upon the desired rotor configuration, slots 203 may align such that they extend axially through stack 101, thus allowing each of the conductive bars 103 to be aligned in parallel with the rotor shaft. Alternately, slots 203 may be slightly skewed, thereby causing the conductive bars 103 within the rotor assembly to be oblique to the axis of the rotor shaft. The center portion 207 of each disc 201 is removed, preferably by boring or during the disc stamping operation, thus providing an opening for the rotor shaft. In at least one preferred configuration, open center portion 207 also includes a slot 209 that is sized to fit a key on the rotor shaft, thereby providing means for locating and positioning the rotor shaft within the stack.

Prior to the casting step, conductive bars 103 (i.e., rotor bars) are inserted into slots 203 of stack 101. In at least one preferred embodiment, bars 103 are approximately 200 to 220 millimeters long with a bar height of between 10 and 25 millimeters and a maximum bar width of between 5 and 15 millimeters. Preferably conductive bars 103 are comprised of copper, and more preferably comprised of oxygen-free electrolytic copper, also referred to as OFE or C10100 copper. OFE copper, which has the highest purity for standardized copper, has a purity grade of 99.99%. As such, it is extremely homogeneous, exhibits high thermal and electrical conductivity, and is immune to hydrogen embrittlement. The use of OFE grade copper bars insures that rotor assembly 101 is structurally much more robust than would be possible if the conductive bars were die cast, since die casting the bars leads to the inclusion of a variety of material defects, imperfections, and impurities that can affect both rotor strength and performance.

Figure 3:
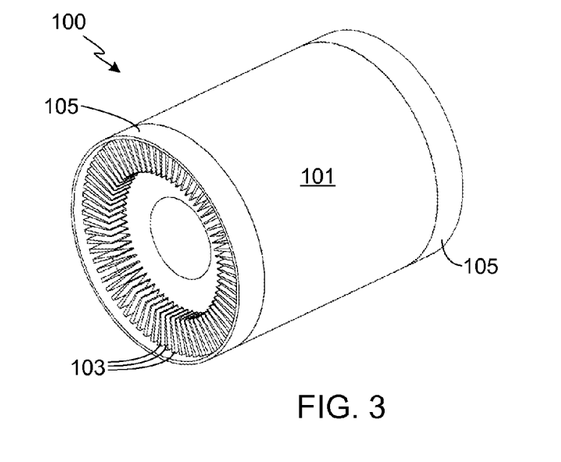
FIG. 3 provides a non-exploded, perspective view of the rotor assembly shown in FIG. 1 prior to die casting.

Although not required, in the preferred embodiment a containment ring 105 is placed at either end of conductive bars 103. While not required, if rotor assembly 100 is intended for use at high rotational speeds, e.g., greater than 12,000 rpm, then the use of containment rings 105 help to prevent copper end ring creep due to centripetal forces. The containment rings are preferably fabricated from stainless steel, although other high strength materials may be used such as beryllium copper, metal matrix composites, etc. Preferably containment rings 105 are positioned around the end portions of conductive bars 103 prior to die casting, thereby eliminating the manufacturing steps of (i) machining the end ring regions of the rotor assembly after die casting and (ii) pressing on the containment rings 105 over the machined end regions. If the containment rings 105 are fit to the end rings after die casting and after machining of the end ring regions, then the containment rings may be held in place via an interference fit, or by soldering, welding or bonding the rings in place. FIG. 3 provides a non-exploded perspective view of rotor assembly 100 prior to die casting. In at least one preferred embodiment, each containment ring 105 has a thickness selected to be within the range of 15 to 40 millimeters and an inner diameter selected to be within the range of 75 to 125 millimeters.

Figure 4:
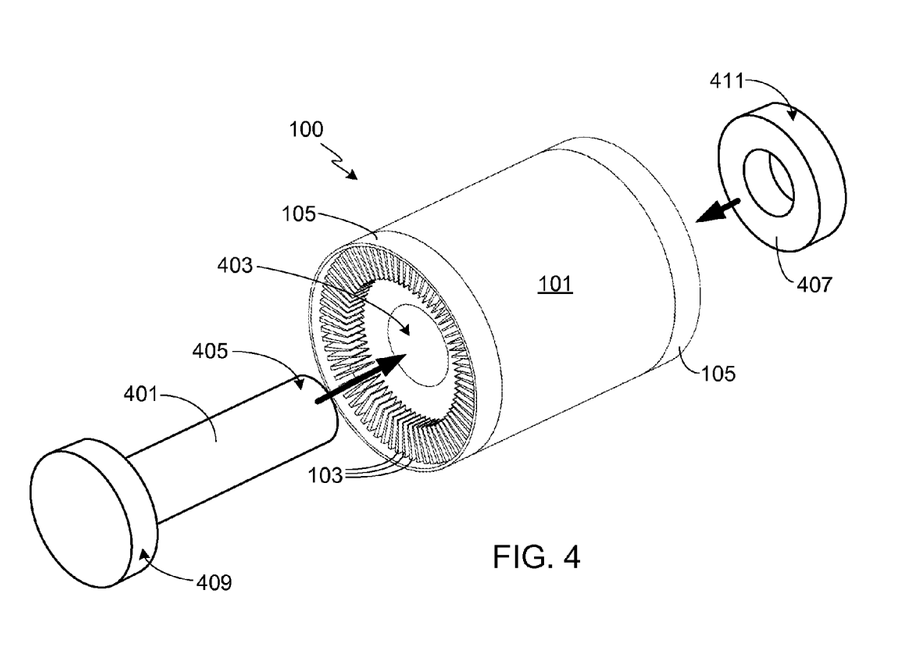
FIG. 4 provides a view of the plug and ring tooling used to prevent the flow of casting material into the bore of the rotor assembly during die casting.

FIG. 4 provides a view of plug 401 prior to being inserted into the bore 403 of rotor assembly 100. After insertion through bore 403, the end portion 405 of plug 401 is captured by ring 407. Plug 401 and ring 407, both of which are preferably fabricated from steel and coated with a non-stick coating designed to prevent adhesion by the molten copper, prevent the copper from flowing into bore 403 during the casting operation. The outer surface of region 409 of plug 401 and the outer surface 411 of ring 407 define, or at least partially define, the inner surfaces of the rotor end rings after completion of the die casting process. It should be understood that while plug 401 and ring 407 are preferred, differently shaped components may be used to define the rotor assembly's end rings as well as prevent copper from flowing into bore 403 during casting. For example, a shaft may be fit within bore 403 and captured at either end by a pair of rings. Alternately, a pair of plugs may be used, where each plug includes a shaft portion that partially enters bore 403 and a ring portion that defines an end ring, and where the two plugs are designed to mate within bore 403.

Figure 5:
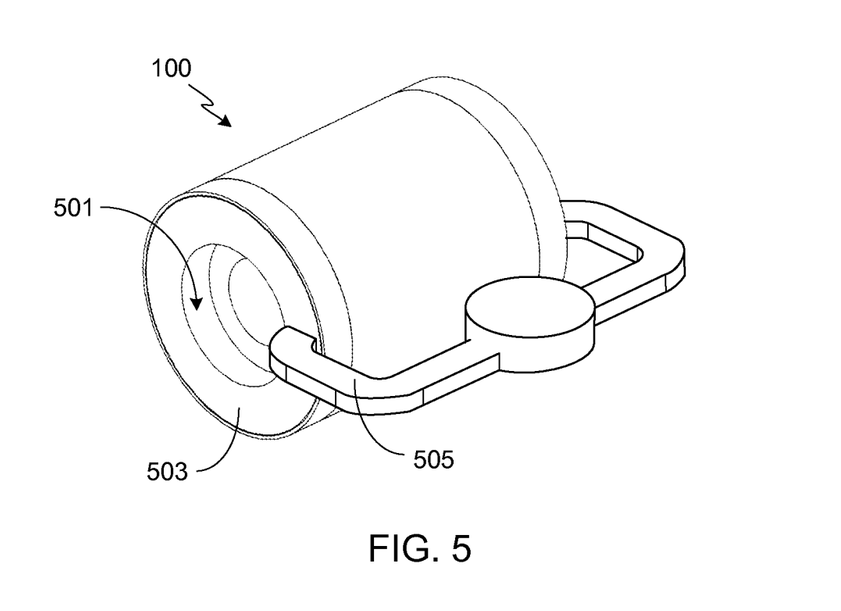
FIG. 5 provides a perspective view of the rotor assembly after die casting and prior to the removal of the gate remnants.

Once the plug 401 and ring 407 are in place, the rotor assembly is placed into a die tooling set, i.e., a casting mold, and pressurized molten copper is fed into the end portions of the rotor assembly, essentially filling the voids between adjacent conductive bars 103 to form contiguous end rings. As previously noted, the inner surfaces 501 of end rings 503 are defined by surface 409 of plug 401 and surface 407 of ring 411. In the preferred embodiment, stainless steel containment rings 105 are positioned about the end portions of the conductive bars 103 prior to casting. Alternately, the casting can be completed first, followed by machining of the outer surface of each end ring, thereby allowing containment rings 105 to be pressed on to the end ring portions after casting. It will be appreciated that by installing the containment rings prior to casting, rings 105 act as a mold or sleeve that contains the casting material (e.g., copper) to the desired location.

Figure 6:
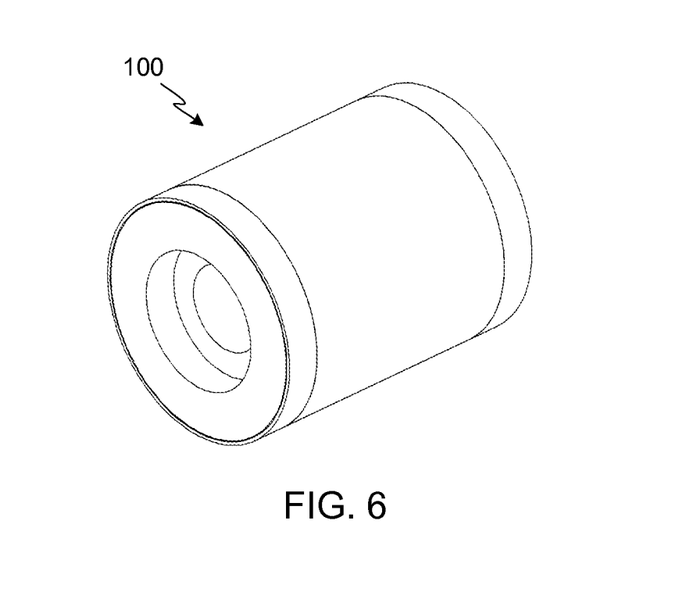
FIG. 6 provides a perspective view of the rotor assembly after die casting and after the removal of the gate remnants.
Figure 7:
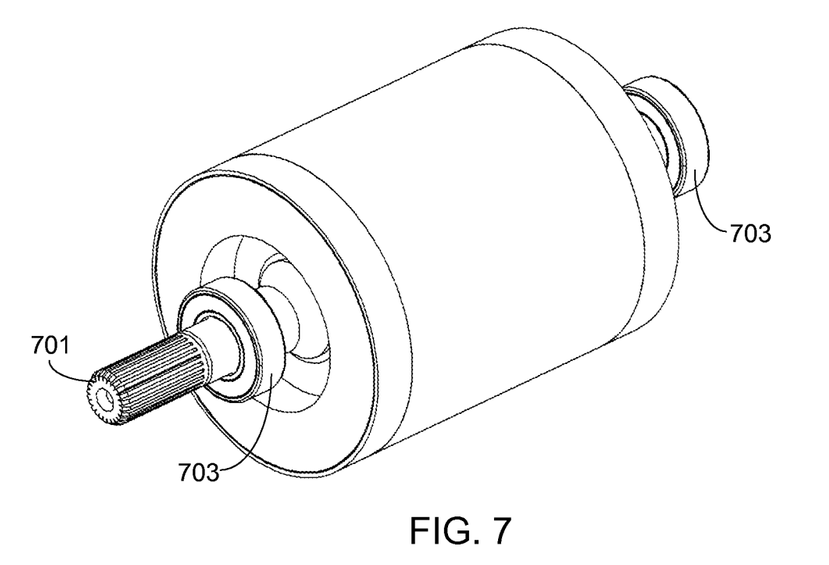
FIG. 7 provides a perspective view of the rotor assembly after insertion of the rotor shaft and mounting of the shaft bearing assemblies.

After the die casting of the end rings is completed and the assembly is cooled, the rotor assembly 100 is removed from the die tooling. Plug tooling 401 and ring tooling 407 are then removed, after which gate remnant 505 may be removed, for example by cutting it off. After removal of the gate remnant 505, the rotor assembly 100 is cleaned and balanced, for example using a grinding operation, leaving a completed rotor assembly 600 as shown in FIG. 6. Rotor shaft 701 is then inserted into the assembly and bearing assemblies 703 are mounted to the shaft, finalizing preparation of the rotor assembly. While not described in detail herein, it will be understood that the casting process may include one or more annealing steps. For example, after the tooling and the gate remnants are removed, the assembly may be heat treated to anneal the copper and improve its electrical and mechanical properties.

Figure 8:
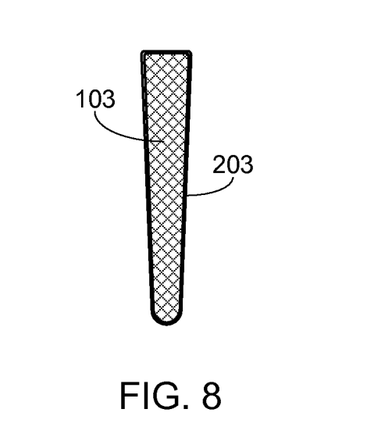
FIG. 8 provides a cross-sectional view of a single slot of the lamination stack and the corresponding conductive rotor bar.
Figure 9:
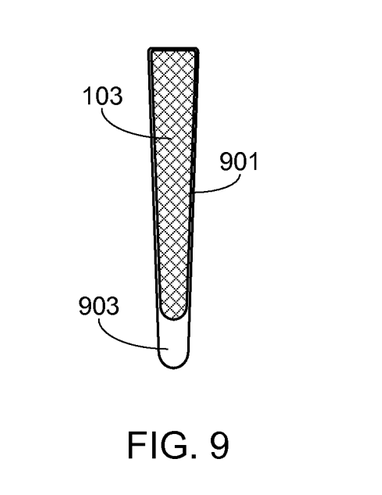
FIG. 9 provides a cross-sectional view of a single slot from an alternate embodiment of the lamination stack along with the corresponding conductive rotor bar.

As previously noted, the present invention is not limited to a specific rotor assembly configuration. For example, in the configuration described above slots 203 in the metal discs 201 are sized to provide a relatively tight fit with conductive bars 103. This aspect is illustrated in FIG. 8 which shows a single slot 203 with the corresponding conductive rotor bar in place. In an alternate embodiment of the invention, the slots within the lamination stack are oversized, thus allowing molten copper to flow into the slots occupied by the conductive bars 103 during the casting process. This configuration is illustrated in FIG. 9 which shows a single slot 901 of a disc 201. Although the region 903 of slot 901 that is not occupied by conductive bar 103 may be located anywhere within the slot, preferably it is beneath the inserted bar 103 as shown since the cast copper that will occupy region 903 after casting is typically of a lesser purity, and thus a higher electrical resistance, than that of bar 103. This configuration for slot 901, and specifically region 903, is also preferred since the cast copper is likely to have imperfections which may result in discontinuous conduction of current in the axial direction, an effect that is better managed when the cast copper is near the bottom of the slot as illustrated. It should be understood that in embodiments utilizing an enlarged slot, such as that shown in FIG. 9, the spacer discs must also include enlarged slots, thus allowing the molten copper to flow through the slots during the casting process.

Figure 10:
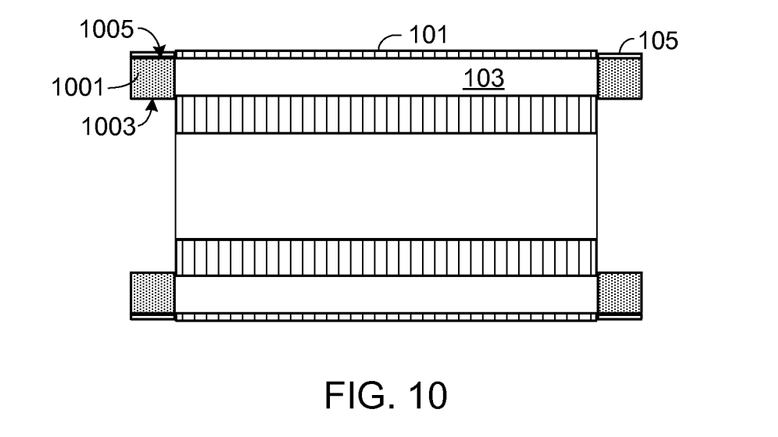
FIG. 10 provides a cross-sectional view of an embodiment of the end ring configuration.
Figure 11:
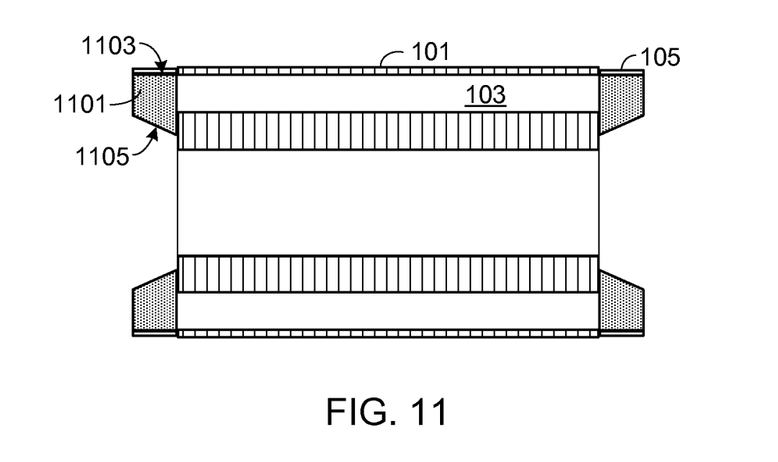
FIG. 11 provides a cross-sectional view of an alternate end ring configuration.
Figure 12:
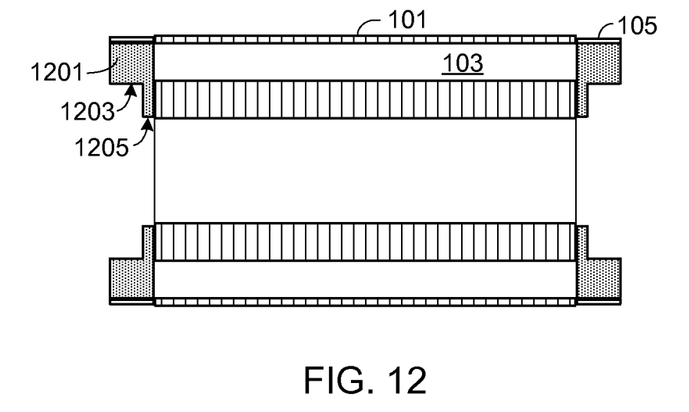
FIG. 12 provides a cross-sectional view of another alternate end ring configuration.

In addition to variations in the slot configuration, thus allowing the conductive bars to be pre-fabricated and augmented with cast copper, the invention may also utilize a variety of different end ring configurations. For example, end ring 1001 shown in FIG. 10 is cast as a simple ring, i.e., with a simple inner cylindrical surface 1003 and a simple outer cylindrical surface 1005. Alternately, end ring 1101 shown in FIG. 11 includes a simple outer cylindrical surface 1103 and a sloped inner surface 1105 that preferably extends to the lamination stack as shown. Alternately, end ring 1201 shown in FIG. 12 includes a stepped inner surface. In the end rings illustrated in FIG. 12, the stepped inner surface of the end rings includes a first, outermost ring 1203 of a first diameter and a second, innermost ring 1205 of a second diameter, where the second diameter is smaller than the first diameter. Note that the stepped inner surface may include more than the two steps shown in the illustrated embodiment. Further, it will be appreciated that the embodiments shown in FIGS. 11 and 12 provide improved stiffness as well as lowered electrical resistance.

Figure 13:
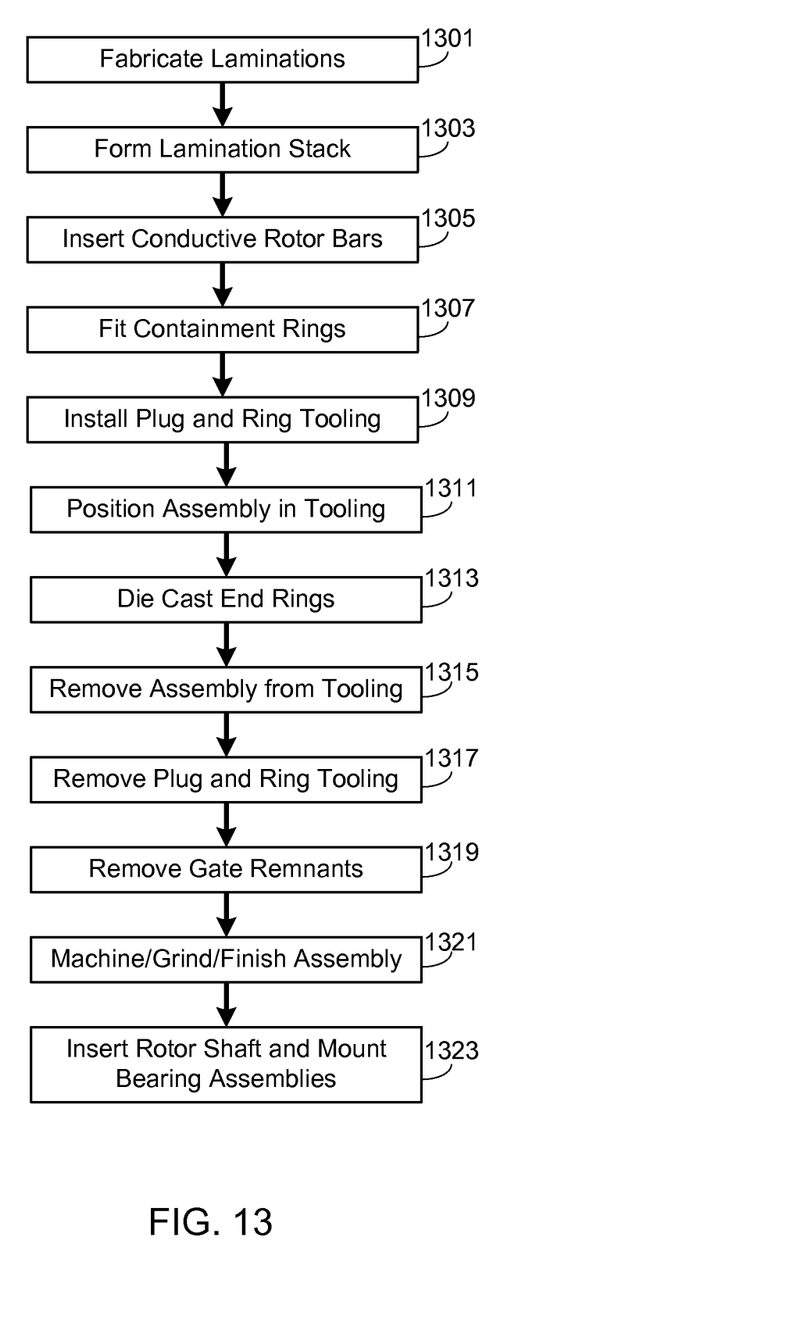
FIG. 13 provides a flow chart of the manufacturing process in accordance with one embodiment of the invention.

FIG. 13 illustrates the primary steps associated with one embodiment of the manufacturing process, the steps of which are described above in detail. As noted, initially the laminations are fabricated (step 1301) and assembled as a stack (step 1303). Conductive copper bars, preferably fabricated from OFE copper, are then inserted into the slots within the lamination stack (step 1305). Containment rings, preferably fabricated from stainless steel, are placed around the end portions of the conductive bars (step 1307). A plug is then inserted into the bore of the assembly and captured via a ring, the plug and ring preventing copper flow into the bore of the rotor assembly and defining the inner surfaces of the assembly's end rings (step 1309). The entire assembly is then positioned within the die casting tooling (step 1311) and the end rings are cast (step 1313). After completion of the casting operation, the assembly is removed from the tooling (step 1315), followed by removal of the plug and ring tooling (step 1317). The gate remnants are then removed (step 1319) and final preparation of the assembly (e.g., machining and/or grinding and/or polishing) is completed (step 1321). Finally the rotor shaft is inserted into the rotor assembly and the bearing assemblies, located at either end of the rotor shaft, are mounted (step 1323). The completed rotor assembly is then ready for assembly into the motor.

Figure 14:
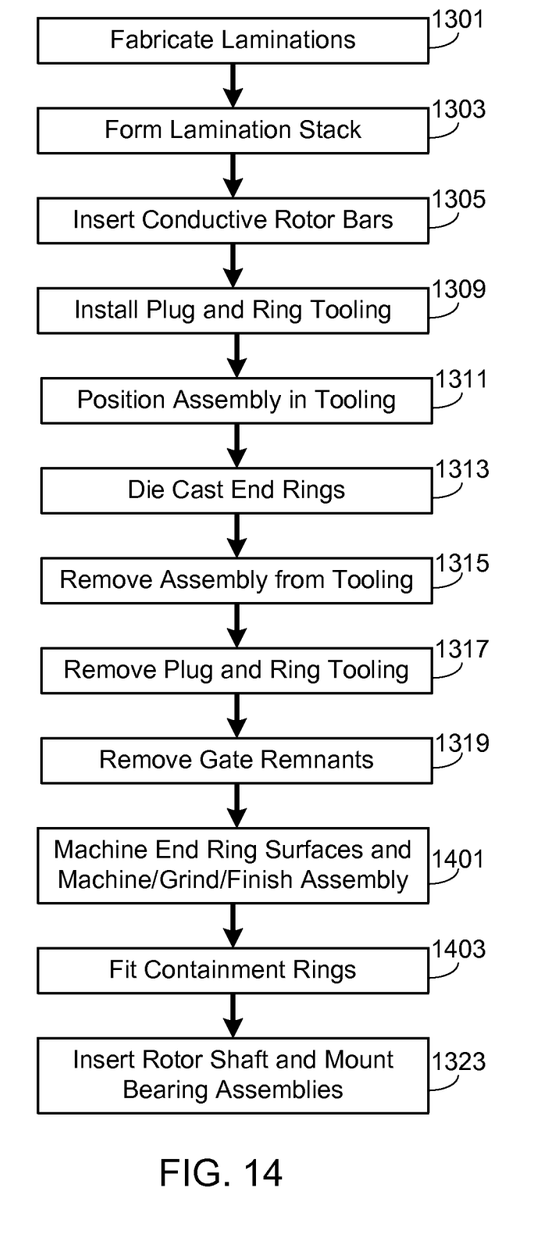
FIG. 14 provides a flow chart of the manufacturing process in accordance with an alternate embodiment of the invention.

The manufacturing process outlined in FIG. 14 is the same as that provided in FIG. 13, except that the stainless steel rings are not placed around the end ring portions of the conductive bars prior to casting. In the process illustrated in FIG. 14, after the end rings have been cast (step 1313) and the tooling has been removed (steps 1315/1317/1319), then the end portions are machined (step 1401) and the stainless steel end rings are press fit onto the end portions of the conductive bars (step 1403).

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of fabricating a rotor assembly for an electric motor, comprising:
   assembling a lamination stack, wherein said lamination stack is comprised of a plurality of lamination discs, wherein each of said lamination discs is comprised of a first plurality of slots, and wherein each of said lamination discs is further comprised of a central bore;
   inserting a plurality of pre-fabricated conductive rotor bars into said first plurality of slots corresponding to said lamination stack, wherein a first end portion of each of said plurality of pre-fabricated conductive rotor bars extends beyond a first end surface of said lamination stack, and wherein a second end portion of each of said plurality of pre-fabricated conductive rotor bars extends beyond a second end surface of said lamination stack;
   locating a shaft within said central bore of said lamination stack;
   locating a first member adjacent to said first end surface of said lamination stack, wherein at least a portion of said first member is encircled by said first end portion of each of said plurality of pre-fabricated conductive rotor bars, and wherein said first member at least partially defines a first end ring of said rotor assembly;
   locating a second member adjacent to said second end surface of said lamination stack, wherein at least a portion of said second member is encircled by said second end portion of each of said plurality of pre-fabricated conductive rotor bars, and wherein said second member at least partially defines a second end ring of said rotor assembly;
   die casting said first end ring and said second end ring of said rotor assembly, wherein said first end ring is comprised of said first end portion of each of said plurality of pre-fabricated conductive rotor bars, and wherein said second end ring is comprised of said second end portion of each of said plurality of pre-fabricated conductive rotor bars; and
   removing said shaft, said first member and said second member from said rotor assembly.

2. The method of claim 1, further comprising:
   fitting a first containment ring around said first end portion of each of said plurality of pre-fabricated conductive rotor bars, wherein said step of fitting said first containment ring is performed prior to said step of die casting said first end ring and said second end ring of said rotor assembly; and
   fitting a second containment ring around said second end portion of each of said plurality of pre-fabricated conductive rotor bars, wherein said step of fitting said second containment ring is performed prior to said step of die casting said first end ring and said second end ring of said rotor assembly.

3. The method of claim 2, further comprising fabricating said first containment ring and said second containment ring from a material selected from the group consisting of a stainless steel, a beryllium copper alloy, and a metal matrix composite.

4. The method of claim 1, further comprising:
   machining said first end ring to remove a first circumferential portion corresponding to said first end ring, wherein said step of machining said first end ring is performed after completion of said die casting step;
   fitting a first containment ring around said first end ring, wherein said first containment ring encircles said first end portion of each of said plurality of pre-fabricated conductive rotor bars, and wherein said first containment ring is positioned where said first circumferential portion of said first end ring was removed during said step of machining said first end ring;
   machining said second end ring to remove a second circumferential portion corresponding to said second end ring, wherein said step of machining said second end ring is performed after completion of said die casting step; and
   fitting a second containment ring around said second end ring, wherein said second containment ring encircles said second end portion of each of said plurality of pre-fabricated conductive rotor bars, and wherein said second containment ring is positioned where said second circumferential portion of said second end ring was removed during said step of machining said second end ring.

5. The method of claim 4, further comprising fabricating said first containment ring and said second containment ring from a material selected from the group consisting of a stainless steel, a beryllium copper alloy, and a metal matrix composite.

6. The method of claim 4, further comprising holding said first containment ring in place around said first end ring and holding said second containment ring in place around said second end ring utilizing one of the following steps:
   a step of forming a first interference fit between said first containment ring and said first end ring and forming a second interference fit between said second containment ring and said second end ring;
   a step of soldering said first containment ring to said first end ring and soldering said second containment ring to said second end ring;
   a step of welding said first containment ring to said first end ring and welding said second containment ring to said second end ring; and
   a step of bonding said first containment ring to said first end ring and bonding said second containment ring to said second end ring.

7. The method of claim 1, further comprising fabricating said plurality of pre-fabricated conductive rotor bars from an oxygen-free electrolytic copper.

8. The method of claim 1, further comprising:
fabricating said shaft, said first member and said second member from steel; and
coating said shaft, said first member and said second member with a non-stick coating to prevent adhesion between said steel and a casting material.

9. The method of claim 1, further comprising fabricating said shaft and said first member as a single component.

10. The method of claim 1, said step of assembling said lamination stack further comprising:
stamping each of said plurality of lamination discs from a metal; and
coating each of said plurality of lamination discs with an electrically insulating coating.

11. The method of claim 1, said step of assembling said lamination stack further comprising:
fabricating each of said plurality of lamination discs from a metal;
fabricating a plurality of electrically insulating spacer discs; and
interposing one of said plurality of electrically insulating spacer discs between adjacent lamination discs of said plurality of lamination discs.

12. The method of claim 1, said step of assembling said lamination stack further comprising:
locating a first end stack lamination disc at a first end of said lamination stack; and
locating a second end stack lamination disc at a second end of said lamination stack, wherein a first thickness corresponding to said first end stack lamination disc is thicker than a third thickness corresponding to each of said plurality of lamination discs interposed between said first end stack lamination disc and said second end stack lamination disc, and wherein a second thickness corresponding to said second end stack lamination disc is thicker than said third thickness corresponding to each of said plurality of lamination discs interposed between said first end stack lamination disc and said second end stack lamination disc.

13. The method of claim 12, said first and second end stack lamination discs comprised of a second plurality of slots, wherein each of said second plurality of slots is of an approximately equivalent size to each of said first plurality of slots.

14. The method of claim 12, said first and second end stack lamination discs comprised of a second plurality of slots, wherein each of said second plurality of slots is larger than each of said first plurality of slots.

15. The method of claim 1, further comprising:
inserting a rotor shaft within said central bore of said lamination stack, wherein said step of inserting said rotor shaft is performed after completion of said die casting step and after completion of said removing step;
mounting a first bearing assembly to said rotor shaft, wherein said first bearing assembly is proximate to said first end ring; and
mounting a second bearing assembly to said rotor shaft, wherein said second bearing assembly is proximate to said second end ring.

16. The method of claim 1, wherein each of said first plurality of slots is sized larger than a cross-section corresponding to each of said plurality of pre-fabricated conductive rotor bars, and wherein said die casting step further comprises forcing a casting material through said first plurality of slots corresponding to said lamination stack.

17. The method of claim 16, wherein after completion of said inserting step, a portion of each of said first plurality of slots extends inwardly towards said central bore past an innermost edge of a corresponding one of said plurality of pre-fabricated conductive rotor bars, and wherein said casting material is forced through said portion of each of said first plurality of slots during said die casting step.

18. The method of claim 1, wherein after completion of said die casting and removing steps, said first end ring is defined by a first ring inner cylindrical surface and a first ring outer cylindrical surface and said second end ring is defined by a second ring inner cylindrical surface and a second ring outer cylindrical surface.

19. The method of claim 1, wherein after completion of said die casting and removing steps, said first end ring is defined by a first ring inner sloped surface and a first ring outer cylindrical surface and said second end ring is defined by a second ring inner sloped surface and a second ring outer cylindrical surface.

20. The method of claim 1, wherein after completion of said die casting and removing steps, said first end ring is defined by a first ring inner stepped surface and a first ring outer cylindrical surface and said second end ring is defined by a second ring inner stepped surface and a second ring outer cylindrical surface.

* * * * *